United States Patent
Chun et al.

(10) Patent No.: US 10,054,921 B2
(45) Date of Patent: Aug. 21, 2018

(54) APPARATUS AND METHOD FOR ADAPTIVELY CONTROLLING A TARGET SYSTEM ACCORDING TO OPERATING ENVIRONMENT

(71) Applicant: ELECTRONICS AND TELECOMMUNICATIONS RESEARCH INSTITUTE, Daejeon (KR)

(72) Inventors: In-Geol Chun, Daejeon (KR); Sung-Joo Kang, Daejeon (KR); Jeong-Min Park, Daejeon (KR); Jae-Ho Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 606 days.

(21) Appl. No.: 14/634,756

(22) Filed: Feb. 28, 2015

(65) Prior Publication Data
US 2015/0253747 A1    Sep. 10, 2015

(30) Foreign Application Priority Data
Mar. 4, 2014   (KR) .......................... 10-2014-0025566

(51) Int. Cl.
*G05B 13/02* (2006.01)
*G05B 19/042* (2006.01)
(52) U.S. Cl.
CPC .. *G05B 19/042* (2013.01); *G05B 2219/25084* (2013.01)

(58) Field of Classification Search
CPC .................... G05B 19/042; G05B 2219/25084
See application file for complete search history.

(56) References Cited

U.S. PATENT DOCUMENTS

| | | | |
|---|---|---|---|
| 2004/0233055 A1* | 11/2004 | Canich | G06Q 10/08 340/539.26 |
| 2007/0005202 A1* | 1/2007 | Breed | B60W 50/0205 701/29.1 |

(Continued)

FOREIGN PATENT DOCUMENTS

| | | | | |
|---|---|---|---|---|
| EP | 2690582 A1 * | 1/2014 | | G06K 9/6263 |
| KR | 10-0903108 B1 | 6/2009 | | |

(Continued)

*Primary Examiner* — Ziaul Karim
(74) *Attorney, Agent, or Firm* — LRK Patent Law Firm (57) ABSTRACT

The present invention relates to an apparatus and a method for adaptively controlling functions of a target system by conditions or by users by controlling the target system based on operating environment of the target system. An adaptive system control apparatus includes an operating environment identification module configured to identify operating environment of a target system based on the sensing data detected by a sensor; a system state estimation module configured to estimate current state of the target system based on the identified operating environment information; a system control module configured to control the target system based on the estimated current state information; and a control result learning module configured to learn the control result of the target system by receiving feedback data from a user.

8 Claims, 4 Drawing Sheets

(56) References Cited

U.S. PATENT DOCUMENTS

| | | | | |
|---|---|---|---|---|
| 2007/0057781 A1* | 3/2007 | Breed | ............... | B60K 35/00 340/457.1 |
| 2007/0075919 A1* | 4/2007 | Breed | ............... | B60R 21/013 345/8 |
| 2007/0150589 A1 | 6/2007 | Kim et al. | | |
| 2008/0065290 A1* | 3/2008 | Breed | ............... | G01L 17/00 701/31.4 |
| 2010/0301770 A1* | 12/2010 | Chemel | ............... | H05B 37/029 315/294 |
| 2012/0089299 A1* | 4/2012 | Breed | ............... | B60C 11/24 701/36 |
| 2012/0190386 A1* | 7/2012 | Anderson | ............... | G01C 15/04 455/456.3 |
| 2013/0234607 A1* | 9/2013 | Kim | ............... | H05B 33/0854 315/158 |

FOREIGN PATENT DOCUMENTS

| | | |
|---|---|---|
| KR | 10-1009638 B1 | 1/2011 |
| KR | 10-2011-0064360 A | 6/2011 |
| KR | 10-1126524 B1 | 3/2012 |
| KR | 10-2012-0054292 A | 5/2012 |
| KR | 10-2012-0098104 A | 9/2012 |

\* cited by examiner

APPARATUS AND METHOD FOR ADAPTIVELY CONTROLLING A TARGET SYSTEM ACCORDING TO OPERATING ENVIRONMENT

CROSS REFERENCE TO RELATED APPLICATION

This application claims the benefit of Korean Patent Application No. 10-2014-0025566, filed on Mar. 4, 2014, entitled "Apparatus and method for adaptively controlling a target system according to operating environment", which is hereby incorporated by reference in its entirety into this application.

BACKGROUND OF THE INVENTION

1. Technical Field

The present invention relates to an apparatus and a method for adaptively controlling a target system according to operating environment and more particularly, to an apparatus and a method for differently controlling functions of a target system by conditions or by users by controlling the target system based on operating environment of the target system.

2. Description of the Related Art

As a computing system has been recently used by a variety of users in a number of different areas, many complex problems which were not considered at the beginning stage of development are caused. Particularly, since the computing system is used in a variety of situations, situations which were not considered at the early development state become more and more. Such situations confuse for users due to unintentional operation of a system and unexpected problems therefrom. Various studies have been conducted in the computing field in order to resolve those problems. However, it is still limited to apply easily.

A system is recently designed and sold for a specific user and only customized user interface (UI) according to that user can be provided by simply changing a user UI.

When several people shares one device such as a smartphone, each person should set user environment and input his/her identification information and password for identification. Technologies such as face recognition, fingerprint recognition and the like has been introduced in order to solve this inconvenience. However, such technologies allows for only automatic change of UIs and setting values for each person.

SUMMARY OF THE INVENTION

Accordingly, the embodiments of the present invention provide an apparatus and a method for adaptively controlling functions of a target system by conditions and/or by users by controlling the target system according to operating environment of the target system.

An apparatus for adaptively controlling a target system according to an embodiment of the present invention is provided in order to achieve the above objections. The apparatus may include: an operating environment identification module configured to identify operating environment of a target system based on the sensing data detected by a sensor; a system state estimation module configured to estimate current state of the target system based on the identified operating environment information; a system control module configured to control the target system based on the estimated current state information; and a control result analysis module configured to learn the control result of the target system by receiving feedback data from a user.

In an embodiment, the sensor may include at least one of an optical sensor, a sound sensor, a light sensor, an image sensor, a gyro sensor, a fingerprint sensor and a motion sensor.

In an embodiment, the operating environment identification module may include: an external environment identification submodule configured to identify external environment where the target system operates; and a user identification submodule configured to identify a user of the target system by using the sensing data.

In an embodiment, the apparatus may further include a data storage module configured to store an external environment identification DB which is used for identifying operating environment of the target system, a user identification DB, and a control profile DB in which control instructions of the target system by states are stored.

In an embodiment, the system state estimation module may include: a state estimation submodule configured to estimate current state of the target system based on the identified operating environment information; and an operating environment learning submodule configured to learn operating environment of the target system by receiving user's feedback data for the estimation result and updating at least one of the external environment identification DB and the user identification DB based on the learned operating environment information.

In an embodiment, the system control module may include: a control instruction generation submodule configured to generate a control instruction appropriate for the estimated current state information with reference to the control profile DB; and a system control submodule configured to control the target system based on the generated control instruction.

In an embodiment, the control result learning module may update the control profile DB based on the learned control result.

A method for adaptively controlling a target system according to an embodiment of the present invention is provided. The method may include: identifying operating environment of a target system based on the sensing data detected by a sensor, estimating current state of the target system based on the identified operating environment information; controlling the target system based on the estimated current state information; and learning the control result of the target system by receiving feedback data from a user.

In an embodiment, the identifying of operating environment may include: identifying external environment where the target system operates by using the sensing data; and identifying a user of the target system by using the sensing data.

In an embodiment, the method may further include establishing an external environment identification DB which is used for identifying operating environment of the target system, a user identification DB, and a control profile DB in which control instructions of the target system by states are stored.

In an embodiment, the estimating of the current state of the target system may include: estimating current state of the target system; providing the estimation result to a user; and learning operating environment of the target system by receiving feedback data from the user for the state estimation result.

In an embodiment, the controlling of the target system may include: generating a control instruction appropriate for the estimated current state information by referring to the control profile DB; and controlling the target system based on the generated control instruction.

The embodiments of the present invention make it possible to automatically control a target system based on operating environment of the target system.

For example, in case that a user repeats the same thing or often forgets things to do, a system may be automatically controlled to operate.

Even though a system is controlled to operate by user's determination, when there is a problem with user's determination, a system may be malfunctioned or may cause unintended operation and it may thus cause personal injuries or loss of properties. In this case, it may be automatically controlled not to cause such problems.

When the present invention is applied to a mobile device such as a smartphone, it allows automatic control of a target system according to external environment of the target system. For example, when it is identified as low-light, high-sound and various sounds (such as music, sound effects and the like), it may be determined as that a target system is currently in a theater. Here, the target system may be automatically controlled to be a silent mode, an automatic vibration mode (strong vibration), an automatic answer mode or the like. In addition, when vertical and horizontal vibration is detected by a gyro sensor and it is identified as low-light and aircraft sound, it may be determined as that a target system is currently in an airplane. In this case, the target system may be automatically controlled to be an airplane mode, a mode for restricting use of a mobile phone, a mode for restricting sound output or the like. On the other hand, when it is identified as high-light, high in human sounds and various sounds sometimes, it may be determined as that a target system is currently in a conference room. In this case, the target system may be automatically controlled to be a vibration mode, an automatic answer mode or the like.

According to another embodiment, it may be automatically controlled by a user. In case of a smart device such as a TV, a smart screen, a smartphone, a tablet and the like, controlling a system is possible by identifying a user. For example, when a toddler or a child uses his/her parent's smart device, a user can be identified through an image sensor, a sound sensor, a touch sensor or the like. Here, when this user is willing to see the smart device at a close distance, automatic control functions such as screen off or warning message or the like can be provided or it is also possible to control access to sites of prohibited images such as adult stuffs and pornograph by using a content filter. For the elderly, control of size of menu and/or font or sound or the like is also possible.

The present invention may be applied to a conventional system (cars, ships, airplanes, toys and the like) in which a smart device is mounted in addition to a smart device. When it is applied to a car, a system may be automatically controlled to limit speed of the car or change the braking force of a braking device of the car on a rainy/snowy day; to limit speed at night; and for preemptive brake operation in order to avoid rollover at a windy day, etc. When a child is willing to drive a car, it may be automatically controlled to stop all functions or when an elderly is willing to drive a car, it can be automatically controlled to increase ambient sounds and car interior volumes (audio, navigation and the like).

Particularly, control functions which are provided to a target system may be changed or complemented through analyses of user's feedback data in the present invention. In addition, control functions may be changed and complemented by external environment of a target system and/or a user through user's feedback data.

DESCRIPTION OF THE EXEMPLARY EMBODIMENTS

While the present invention has been described with reference to particular embodiments, it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted.

Unless clearly used otherwise, expressions in the singular number include a plural meaning.

In addition, "module", "submodule", "unit", "interface" and the like among terms used in the present invention generally mean objects relating to a computer such as hardware, software and combinations thereof.

Exemplary embodiments of the invention will be described below in more detail with reference to the accompanying drawings.

Figure 1:
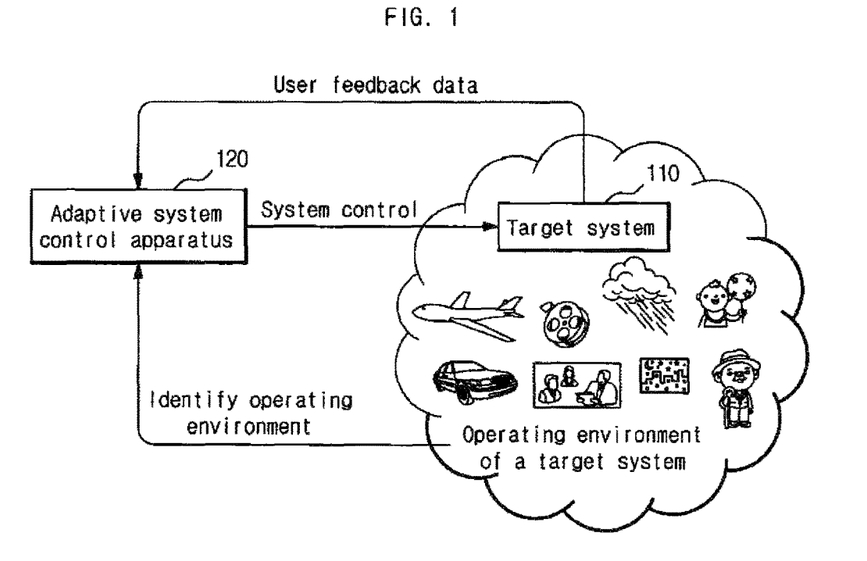
FIG. 1 is a schematic view illustrating interaction between an adaptive system control apparatus according to the present invention and a target system controllable by the apparatus.

FIG. 1 is a schematic view illustrating interaction between an adaptive system control apparatus according to the present invention and a target system controllable by the apparatus.

A target system 110 includes a variety of smart devices equipped with a sensor such as a TV, a smartphone, a tablet PC, a wearable computer and the like and a variety of devices in which a computing device is mounted such as a car, an unmanned plane, a ship, a toy and the like equipped with a sensor.

An object of the present invention is to control a target system 110 according to operating environment of the target system 110 by using an adaptive system control apparatus 120, in which the operating environment may include external environment where the target system 110 operates and a user of the target system 110.

The adaptive system control apparatus 120 may identify operating environment information of the target system 110 such as external environment information and user information, estimate state of the target system 110 based on the identified operating environment information, and control the target system 110 by using the estimated result. In addition, the adaptive system control apparatus 120 may perform machine-learning for operating environment and control result, by using user's feedback data.

FIG. 1 only illustrates a case that the adaptive system control apparatus 120 is installed outside of the target system 110 as a separate device for convenience of explanation. However, the adaptive system control apparatus 120 may be implemented inside the target system 110.

Figure 2:
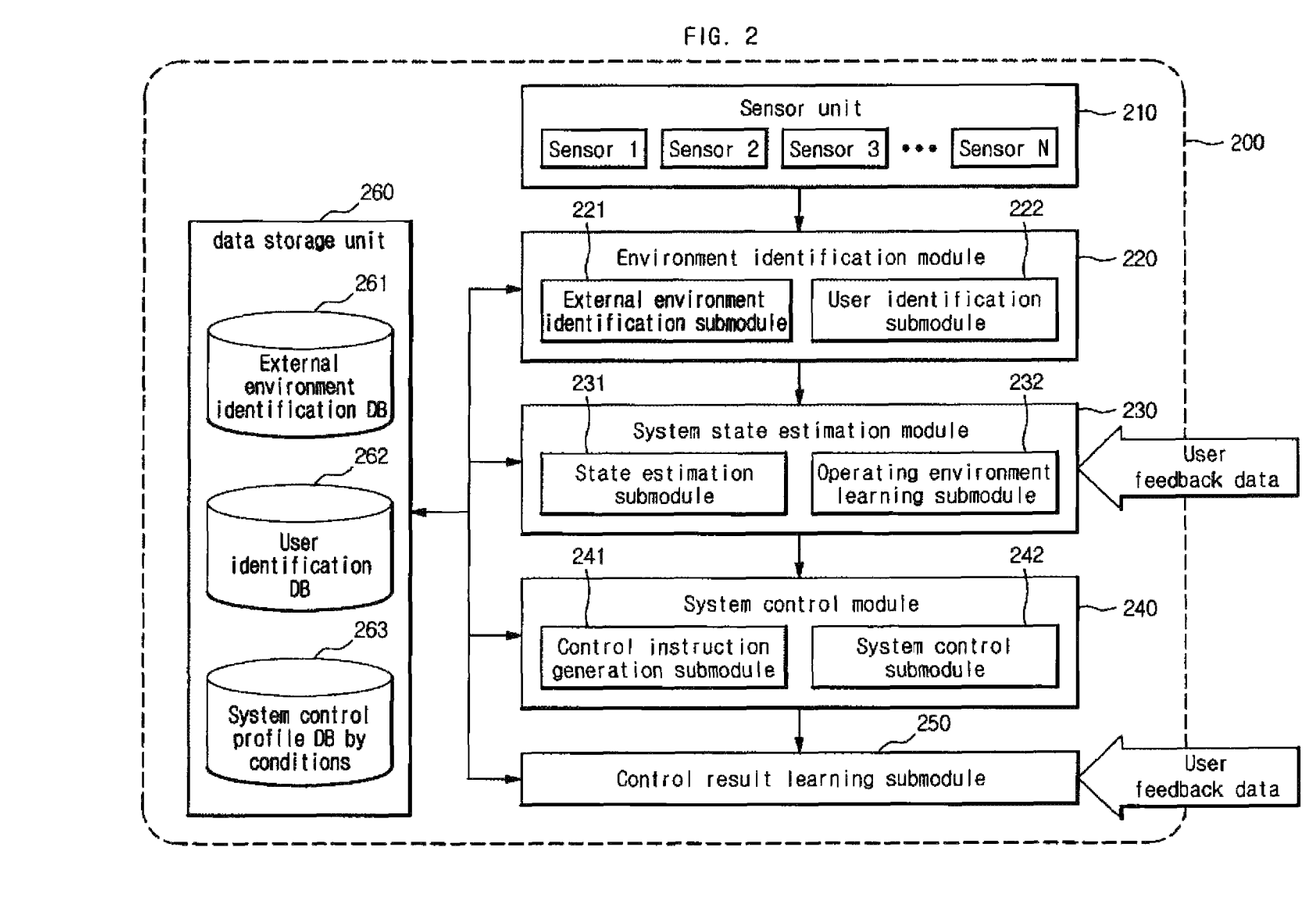
FIG. 2 is a block view illustrating an adaptive system control apparatus according to an embodiment of the present invention.

FIG. 2 is a block view illustrating an adaptive system control apparatus according to an embodiment of the present invention.

As shown in FIG. 2, an adaptive system control apparatus 200 may include a sensor module 210, an operating environment identification module 220, a system state estimation module 230, a system control module 240, a control result learning module 250, and a data storage module 260.

In an embodiment, the sensor module 210 is used to detect data needed to identify operating environment information of a target system. It includes various kinds of sensors such as an optical sensor, a sound sensor, a light sensor, an image sensor, a gyro sensor, a fingerprint sensor, a motion sensor and the like. The sensor module 210 may collect not only external environment of the target system but also user information.

FIG. 2 only illustrates a case that the sensor module 210 is included in the adaptive system control apparatus 200. However, it is to be appreciated that when the adaptive system control apparatus 200 is implemented in the target system, the adaptive system control apparatus 200 may use sensors mounted in the target system by those skilled in the art.

The operating environment identification module 220 identifies operating environment of the target system based on the sensing data detected by the sensor module 210.

In an embodiment, the operating environment identification module 220 may include an external environment identification submodule 221 to identify external environment where the target system operates by using the sensing data detected by the sensors and a user identification submodule 222 to identify a user of the target system by using the information detected by the sensors.

In an embodiment, the external environment identification submodule 221 may identify external environment information where the target system operates based on the external environment identification DB 261 pre-built in the data storage module 260.

The external environment identification DB 261 is a database that stores information which is used to estimate the location where the target system is used. Examples may include photos of various places to identify external environment by using information detected by an optical sensor, sound sample data by places to identify external environment by using information detected by a sound sensor, weather information by places to identify external environment by using information detected by a temperature/humidity/pressure sensor, motion sample information to identify external environment by using information detected by gyro sensor/acceleration sensors. The information may include various types of external environment identification information depending on sensors installed in the target system and thus it is not limited to the information described in the present invention.

In an embodiment, the user identification submodule 222 may identify information of a user who currently uses the target system based on a user identification DB 262 pre-built in the data storage module 260.

Information to identify a user who is to use the target system is stored in the user identification DB 262. For example, user photos to identify a user by using information detected by an optical sensor, sound information to identify a user by using information detected by a sound sensor, fingerprint information to identify a user by using information detected by a fingerprint sensor, passwords or identification patterns to identify a user by using user inputs may be stored. The information to identify a user may be various types of information depending on sensors installed in the target system and thus it is not limited to the information described in the present invention.

The system state estimation module 230 may estimate current state of the target system based on the identified environment information which is external environment information of the system and current user information.

In an embodiment, the system state estimation module 230 may include a state estimation submodule 231 and an operating environment learning submodule 232.

The state estimation submodule 231 may estimate current state of the target system based on operating environment information identified by the operating environment identification module 220.

In an embodiment, the state estimation submodule 231 may obtain additional information needed to estimate current state by performing Internet search based on at least one of external environment information and current user information identified by the operating environment identification module 220 if necessary. For example, information of a concert hall where sound is heard may be obtained by performing internet search by using sound information detected through a sound sensor.

The operating environment learning submodule 232 may learn operating environment by receiving user's feedback data for estimation results of the state estimation submodule 231 and update at least one of the external environment identification DB 261 and the user identification DB 262 based on the learned operating environment information.

When the estimation result of the state estimation submodule 231 does not match to the satisfaction of a user, the user provides feedback data and the operating environment learning submodule 232 performs machine-learning for operating environment by using this feedback data.

The system control module 240 may control the target system based on the current state of the target system information estimated by the system state estimation module 230.

In an embodiment, the system control module 240 may include a control instruction generation submodule 241 and a system control submodule 242.

The control instruction generation submodule 241 may generate a control instruction appropriate to the estimated current state information with reference to a system control profile DB 263 pre-built in the data storage module 260. In an embodiment, the system control profile DB 263 may include control profile information by conditions/target systems when there are a variety of target systems.

The system control profile DB 263 stores control information for a target system based on location/environment where a user intends to operate the target system. The user can be identified by the user identification submodule 222. The system control profile DB 263 may provide control information desired by a user in advance and can be machine-learned in a desired form for each user through users' feedback.

The external environment identification DB 261, the user identification DB 262 and the system control profile DB 263 may be used as originally set when the system is built or can be machine-learned through users' feedback. In addition, These DBs can be updated by an external server through Internet. Data provided by a variety of users may be available in an external server and desired data may be downloaded and used by searching the data.

The system control submodule 242 may control the target system based on the control instruction generated by the control instruction generation submodule 241.

The control result learning module 250 may receive feedback data from a user for the control result of the target system, learn the received control result, and update the system control profile DB 263 based on the learned control result.

Figure 3:
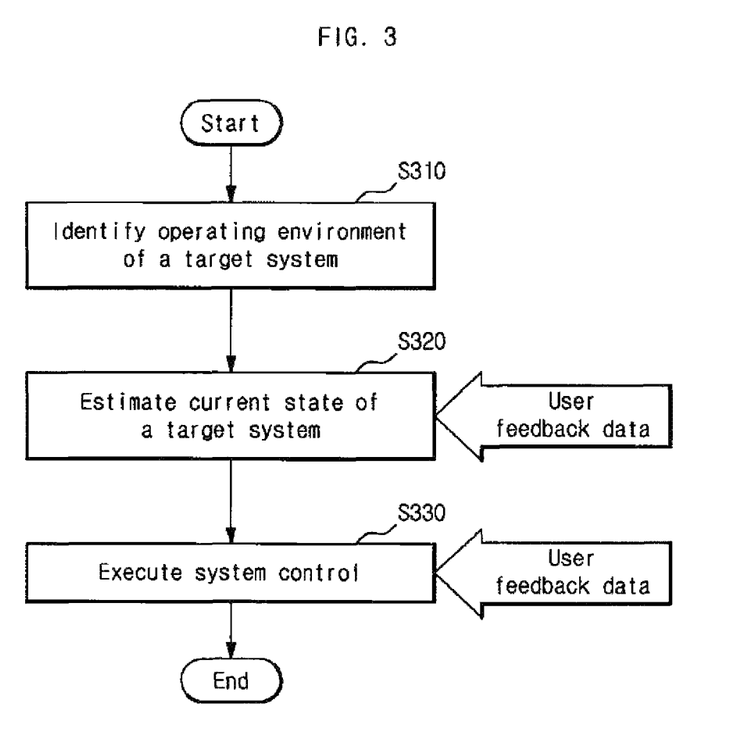
FIG. 3 is a flowchart illustrating an adaptive system control method according to an embodiment of the present invention.

FIG. 3 is a flowchart illustrating an adaptive system control method according to an embodiment of the present invention.

In an embodiment, a process for adaptively controlling a target system may include identifying operating environment of the target system in S310, estimating current state of the target system based on the identified operating environment information in S320, and controlling the target system based on the estimated current state information in S330. Each step of from S310 to S330 will be explained in detail with reference to FIG. 4 below.

Figure 4:
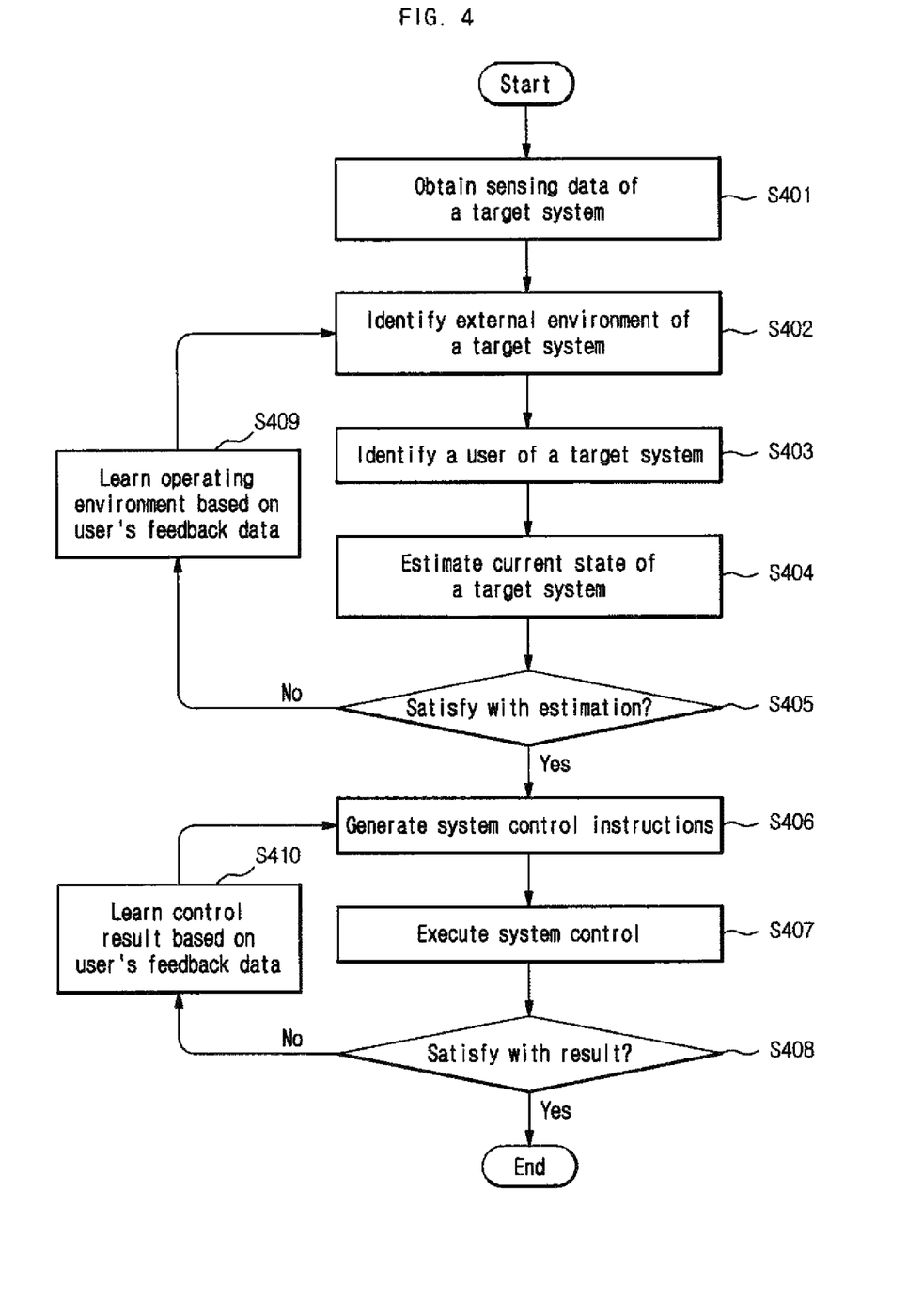
FIG. 4 is a flowchart illustrating a detailed adaptive system control method according to an embodiment of the present invention.

FIG. 4 is a flowchart illustrating a detailed adaptive system control method, according to an embodiment of the present invention.

In S401, various sensing data needed to identify operating environment information of the target system are obtained. In an embodiment, data about external environment in which the target system operates and data about the user who uses currently the target system by using various sensors installed in the target system or an adaptive control device. In S402, external environment of the target system is identified by using the sensing data obtained in S401 and then in S403, a current user of the target system is identified. In an embodiment, an external environment identification DB which stores external environment information corresponding to the sensing data and a user identification DB which stores user information are established so that external environment and user information can be identified by using these databases.

In S404, current state of the target system is estimated based on the external environment information and the user information identified in S402 and S403.

In S405, the estimated result in S404 is provided to a user and satisfaction of the user can be determined. When the estimated result of current state does not satisfy the user, machine-learning can be performed by using feedback from the user in S409. The external environment identification DB and the user identification DB may be updated in order to reflect the learned result, if necessary.

In S406, a system control instruction is generated with reference to the pre-built system control profile DB to be appropriated to the estimated current state of the target system. In an embodiment, the system control profile DB may be built by types of various target systems to control the various target systems.

In S407, the system is controlled by actually applying the system control instructions generated in S406.

In S408, satisfaction of the user is determined for the control result of the target system.

When the user does not satisfy with the control result of the target system, machine-learning may be performed by using the user's feedback data in S410 and the system control profile DB may be then updated to reflect the learned control result.

When the present invention is applied to a mobile device such as a smartphone, automatic control functions of a target system may be provided according to external environment of the target system. For example, when a mobile device recognizes a user and operates predetermined functions, the mobile device can recognize the user through sensors installed therein. An optical sensor such as a camera to recognize a user, a sound sensor to recognize sounds, a touch sensor to recognize fingerprints and the like are needed. The information collected from the sensors is compared with data in a user identification DB to identify the user and the estimation results can be analyzed through user's feedbacks to reduce identification errors. In addition, the external environment is identified and used with the user's estimation result in the present invention. The followings are needed to identify external environment in a mobile device: an illumination sensor to identify light intensity; a sound sensor to identity external sounds; a gyro sensor and an acceleration sensor to identify motion of the user who has the mobile device; a temperature sensor, a humidity sensor, and a pressure sensor to identify temperature, humidity, wind velocity and the like of external environment; and a GPS sensor to identify moving path, etc. The data collected from those sensors is compared with the data in the external environment identification DB to identify environment where the mobile device is currently used and the estimated result of the external environment is analyzed to reduce identification errors using user's feedback.

The identified user identification result and the external environment identification result are compared with the system control profile DB by conditions to perform a corresponding control and the control result is learned to reduce control errors through user's feedbacks.

For example, it is assumed that a user who has a mobile device is in a concert hall such as a theater for an example of applying the method for controlling a target system described above. The mobile device recognizes a user by using at least one of an optical sensor, a sound sensor and a touch sensor and identifies the motion which the user wants therethrough. When the user having the mobile device enters a theater, it is identified that it is in a dark place through an illumination sensor and there are loud voice, music, sound effects and the like through a sound sensor. Particularly, music and sound effects can be determined by being connected with a search site through Internet and information about the place where the music is currently played can be also determined through Internet. As such, when the user information and the external environment information are identified, it can be determined that the user is currently in a concert hall and the mobile device can be thus automatically changed to a silent mode or an automatic vibration mode (strong vibration) or an automatic answer mode. This is the learned result through the data stored in the system control profile DB by conditions and feedbacks.

In another embodiment, when motion of a mobile device detected by a gyro sensor, low-illumination detected by an illumination sensor, aircraft noise detected by a sound sensor, low-air pressure detected by a pressure sensor are recognized, it can be estimated that the mobile device is in an airplane and then current location and airline schedule can be estimated by comparing airline service information of airlines which are currently operating through internet. Accordingly, when it is determined that the mobile device is in the airplane by comparing the user and external environment estimation information, it can be automatically changed to an airplane mode or a restriction mode of mobile phone functions, a restriction mode of sound output, and also perform time change to arrival time and the like.

In another embodiment, when high-illumination detected by an illumination sensor, voices of people and sometimes different sounds detected by a sound sensor, various faces of people detected by an optical sensor are recognized, it can be estimated that a mobile device is currently in a meeting room. When it is determined that it is inside the meeting room by comparing the user and external environment estimation information, it is then automatically changed to a vibration mode or an automatic answer mode.

In still another embodiment, an automatic control of a device such as a smart device or mechanical device is provided. In case of a smart device such as a TV, a smart screen, a smartphone, a tablet and the like, after identifying a user, it is possible to control a system according to the user. For example, when a toddler or a child uses his/her parent's smart device, it is possible to control functions. The smart device can determine that the user is a toddler or a child by using an optical sensor, by analyzing sounds using a sound sensor, or by analyzing use patterns using a touch sensor.

In case of a smart device such as a TV when the smart device is viewed at a close distance, it is possible to perform automatic control of providing a screen off message or warning message to warn a user or provide functions (for example, screen off, images recorded by a parent and the like) which are predetermined by a parent, or to control an access to prohibited images such as adult stuffs, adult/harmful sites through content filtering or determining types of images according to image rating. On the other hand, when it identifies that a user of a smart device is an old man, it is possible to increase size of menu and/or font, increase volume and the like which provides appropriate functions depending on users. Furthermore, when a control function does not satisfy a user, it is possible to change or add a control function which is desired to the user through analysis of the control result.

The present invention may be applied to a conventional system such as a car, a ship, an airplane, a toy and the like in which a computing device is mounted as well as the smart device. When it is applied to a car, information such as clear, rain, snow or the like or current environment can be estimated through an optical sensor and a rain sensor. In addition, degree of darkness or current time/location information can be also estimated through an illumination sensor and a GPS sensor and information about location where the car is currently, speed limit, location of a traffic signal can be searched by connecting to internet. When it is identified that a car is on the rain/fog or snow environment, it is possible to automatically control reaction time to a gas pedal or limit on acceleration according to identification result of a driver (such as a young adult who has fast reaction against external environment, an elderly man who has slow motion, male or female and the like). In case of night driving, it is possible to automatically limit speed by reflecting user identification result. Road information is estimated using an air pressure/humidity/temperature sensor to identify weather and optical/ultrasonic sensors to acquire road images. In case of windy weather or bumpy road or that there are obstructions on the road, it is possible to operate speed limit and preemptive brake and steering wheel according to state of the road (asphalt, concrete, dirt, or the like).

In an embodiment for controlling a car according to user recognition, when it is determined that a child is sitting in the driver's seat through optical/sound/ultrasonic sensors, stopping of an driving function is available. On the other hand, when it is determined that an elderly man is sitting in the driver's seat, it can be automatically controlled to limit the maximum speed and operate preemptive brake for safe driving, and increase ambient sounds and volume of audio, navigation and the like. In case of a passenger seat(s) of a car or ship/airplane, desired services can be provided by identifying each passenger. When the passenger is a child, educational programs can be provided to the seat through a personal terminal installed in the seat and further control of game time, control of watching adult programs and the like can be provided. When it is applied to a child's toy, control of the toy can be provided according to a parent intention or according to age or sex of the child. In case of an educational toy, it is possible to provide contents depending on ages and/or user settings and also provide different contents and UI depending on sex.

When power of a system, in which the apparatus of the present invention is applied, is blocked, it can be controlled to stop unnecessary functions and operate only necessary functions. For example, when it is applied to a device such as an unmanned plane or an unmanned car, a problem is caused to power or energy supply, and current weather is cloudy, it can be controlled to turn the power off of the sensors such as an optical sensor and an illumination sensor which are useless even though they operate in the current external environment and increase the power of the sensors such as an ultrasonic sensor and an infrared sensor which are not affected by the weather.

The exemplary embodiments of the present invention described hereinabove are only an example of the present invention and may be variously modified and altered by those skilled in the art to which the present invention pertains without departing from essential features of the present invention.

Particularly, control functions which are provided to the target system can be changed and/or complemented through analyses of user's feedback data in the present invention.

The apparatus and method according to exemplary embodiments of the present invention can be implemented in a computer system, for example, a computer readable recording medium. The computer readable medium may include a program instruction, a data file and a data structure or a combination of one or more of these.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the invention. The scope of the present invention should be interpreted by the following claims and it should be interpreted that all spirits equivalent to the following claims fall with the scope of the present invention.

What is claimed is:

1. An adaptive system control apparatus comprising a computer device for:
   an operating environment identification module configured to identify an identified operating environment of a target system based on sensing data detected by a sensor;
   a system state estimation module configured to estimate an estimated current state of the target system based on the identified operating environment;
   a system control module configured to control the target system based on the estimated current state of the target system; and
   a control result learning module configured to learn a learned control result of the target system by receiving feedback data from a user,
   a data storage module storing an external environment identification database (DB) which is used for identifying the identified operating environment of the target system, a user identification database (DB), and a control profile database (DB) in which control instructions of the target system by states are stored,
   wherein the system control module is configured to control, based on the estimated current state of the target system,: a silent mode of the target system, a vibration mode of the target system, an automatic answer mode of the target system, an airplane mode of the target system, a mode for restricting use of a mobile phone of the target system, a mode for restricting sound output of the target system, access by the target system to sites of prohibited images by using a content filter, size of menu or fonts displayed by the target system, speed of a car in which the target system is carried or mounted, braking force of braking device of a car in which the target system is carried or mounted, preemptive brake operation of a car to avoid rollover of a car in which the target system is carried or mounted, ambient sounds in a car in which the target system is carried or mounted, car interior volumes of a car in which the target system is carried or mounted and stopping of all functions of a car in which the target system is carried or mounted, and
   wherein the system state estimation module comprises:
   a state estimation submodule configured to estimate an estimated current state of the target system based on the identified operating environment; and
   an operating environment learning submodule configured to learn a learned operating environment of the target system by receiving user's feedback data for the estimation result and updating at least one of the external environment identification DB and the user identification DB based on the learned operating environment of the target system.

2. The adaptive system control apparatus of claim 1, wherein the sensor comprises at least one of an optical sensor, a sound sensor, a light sensor, an image sensor, a gyro sensor, a fingerprint sensor and a motion sensor.

3. The adaptive system control apparatus of claim 1, wherein the operating environment identification module comprises:
   an external environment identification submodule configured to identify an external environment where the target system operates; and
   a user identification submodule configured to identify a user of the target system by using the sensing data.

4. The adaptive system control apparatus of claim 1, wherein the system control module comprises:
   a control instruction generation submodule configured to generate and control an instruction appropriate for the estimated current state of the target system with reference to the control profile DB; and
   a system control submodule configured to control the target system based on the generated control instruction.

5. The adaptive system control apparatus of claim 1, wherein the control result learning module updates the control profile DB based on the learned control result of the target system.

6. An adaptive system control method, the method being implemented by a processor executing instructions stored in a memory and comprising:
   identifying an identified operating environment of a target system based on sensing data detected by a sensor;
   estimating an estimated current state of the target system based on the identified operating environment of the target system;
   controlling the target system based on the estimated current state of the target system;
   learning a learned control result of the target system by receiving feedback data, from a user; and
   establishing an external environment identification database (DB) which is used for identifying the identified operating environment of the target system, a user identification database (DB), and a control profile DB in which control instructions of the target system by states are stored,
   wherein controlling the target system based on the estimated current state of the target system comprises controlling a silent mode of the target system, a vibration mode of the target system, an automatic answer mode of the target system, an airplane mode of the target system, a mode for restricting use of a mobile phone of the target system, a mode for restricting sound output of the target system, access by the target system to sites of prohibited images by using a content filter, size of menu or fonts displayed by the target system, speed of a car in which the target system is carried or mounted, braking force of braking device of a car in which the target system is carried or mounted, preemptive brake operation of a car to avoid rollover of a car in which the target system is carried or mounted, ambient sounds in a car in which the target system is carried or mounted, car interior volumes of a car in which the target system is carried or mounted and stopping of all functions of a car in which the target system is carried or mounted, and
   wherein the estimating of the current state of the target system comprises:
   estimating current state of the target system based on the identified operating environment;
   providing the estimation result to a user; and
   learning a learned operating environment of the target system by receiving feedback data from the use.

7. The adaptive system control method of claim 6, wherein the identifying of the identified operating environment comprises:
   identifying external environment where the target system operates; and
   identifying a user of the target system by using the sensing data.

8. The adaptive system control method of claim 6, wherein the controlling of the target system comprises:

generating a control instruction appropriate for the estimated current state of the target system by referring to the control profile DB; and controlling the target system based on the generated control instruction.

\* \* \* \* \*